United States Patent [19]

Dettelbach et al.

[11] Patent Number: 4,535,574

[45] Date of Patent: Aug. 20, 1985

[54] SANDING TOOL AND METHOD OF MAKING SUCH TOOL

[75] Inventors: Alfred Dettelbach, Stuttgart; Gerhard Gresser, Oberboihingen, both of Fed. Rep. of Germany

[73] Assignee: REICH Spezialmaschinen GmbH, Nuertingen, Fed. Rep. of Germany

[21] Appl. No.: 436,311

[22] Filed: Oct. 25, 1982

[30] Foreign Application Priority Data

Nov. 6, 1981 [DE] Fed. Rep. of Germany ....... 3144077

[51] Int. Cl.³ .............................................. B24D 15/00
[52] U.S. Cl. ......................................... 51/204; 51/296; 51/363; 264/46.4; 264/46.8
[58] Field of Search ............. 51/296, 363, 204, 205 R; 264/46.4, 101, 102, 46.8

[56] References Cited

U.S. PATENT DOCUMENTS

| 1,570,177 | 1/1926 | Pointer ................................. 51/363 |
| 2,717,422 | 9/1955 | Rowe et al. ......................... 51/204 |
| 3,747,281 | 7/1973 | Fedjukin .............................. 51/204 |
| 3,759,644 | 9/1973 | Ladney ............................... 264/102 |
| 3,850,589 | 11/1974 | Charvat ............................... 51/296 |
| 3,878,277 | 4/1975 | Velte .................................. 264/46.4 |
| 4,035,161 | 7/1977 | Geissler et al. ...................... 51/296 |
| 4,106,915 | 8/1978 | Kagawa et al. ...................... 51/296 |

FOREIGN PATENT DOCUMENTS

| 2544668 | 4/1977 | Fed. Rep. of Germany ..... 264/46.8 |
| 0139683 | 12/1978 | Japan .................................. 264/46.8 |
| 6093525 | 7/1981 | Japan .................................. 264/46.8 |
| 1098312 | 1/1968 | United Kingdom ............... 264/46.8 |

*Primary Examiner*—James Derrington
*Attorney, Agent, or Firm*—W. G. Fasse; D. H. Kane, Jr.

[57] ABSTRACT

A sanding tool (8) or surface finishing tool for sanding or finishing a work piece such as profiled moldings or edges of panel type work pieces has a foam material body (17), at least one surface of which has a contour corresponding to the cross-sectional shape of the surface to be sanded or finished. A sanding or finishing belt (11) is secured to the contoured surface of the foam material body. The tool is produced in a simple, economical manner by casting or molding. For this purpose a profiled body having a surface configuration corresponding to that of the work piece is inserted into a mold. A length of sanding belt or sandpaper is inserted into the mold so that the rough surface faces the profiled body. The mold is then filled with a foam material which, after curing, is intimately bonded to the sanding belt or paper with the desired contour.

4 Claims, 3 Drawing Figures

SANDING TOOL AND METHOD OF MAKING SUCH TOOL

CLAIM TO PRIORITY

The present application is based on German Ser. No. P 31 44 077.0, filed in the Federal Republic of Germany on Nov. 6, 1981. The priority of the German filing date is claimed for the present application.

BACKGROUND OF THE INVENTION

The present invention relates to a sanding or finishing tool and to a method of making such a tool which has at least one profiled or contoured surface covered with a grinding or sanding material or a very fine finishing material such as emery powder.

For sanding or grinding the surfaces of moldings having a profiled surface contour or cross-section and for sanding or grinding the edge surfaces of panel type work pieces tools are required which have a counter profile matching with the surface configuration or profile to be finished. The counter or matching profile of the tool is coated with the grinding material. It is known to make such sanding or grinding or finishing tools of rubber, cork or similar materials, whereby the counter or matching profile is machined into the tool, for example by a grinding operation. Thereafter, a grinding cloth is secured to the machined surface of the tool, for example by an adhesive bonding. Due to the machining operation, the manufacture of such tools requires a substantial number of man-hours and is thus expensive. Moreover, the desired counter surface or matching surface configuration is not always free of faults, especially when sharp corners and edges must be covered with the grinding cloth. Thus, prior art tools do not always avoid that when they are used they actually change the configuration of the molding profile that is being sanded or finished.

OBJECTS OF THE INVENTION

In view of the above it is the aim of the invention to achieve the following objects singly or in combination:

to provide a method for manufacturing a sanding, grinding or finishing tool in a simple and inexpensive manner;

to assure that the contours of the counter or matching surface of the tool will correspond exactly to the contours of the molding to be finished; and to provide a molded or cast sanding, grinding or finishing tool made of a foam material such as a polyurethane foam of different densities depending on the use of the tool.

SUMMARY OF THE INVENTION

The present tools are manufactured in a foaming mold which is equipped with at least one inwardly facing profiled surface configuration corresponding to that of the molding for which the tool is intended. The grinding material is then applied to the profiled surface in the mold. Such grinding material may include a finishing material such as a very fine emery powder. A curable foam is then filled into the mold and the mold is closed to permit the curing of the foam material, whereby the abrasive or finishing material is intimately bonded to the cured foam material along the profiled surface configuration. When the tool is removed from the mold it is substantially a finished tool ready for use. However, several, for example, different surface contours could be provided in a single mold, whereby either one tool with several differently shaped working surfaces could be produced or the resulting molded foam material body could be cut, after the curing, into several separate tools.

It is an advantage of the invention that the present method may be practiced economically even where a large number of different profiles or surface contours are required and also where the number of tools to be made is relatively small.

Moreover, the mold and manufacturing tools are most simple and inexpensive while simultaneously assuring very precise counter or matching surfaces in the tools manufactured according to the invention. Moreover, the shape of the tool is easily adaptable to different purposes, for example, the shape may be that of a simple hand tool or that of a tool which is employed in a stationary sanding machine through which the work piece is being moved.

The counter or matching contour of the tool may be made very precise and true to the desired original contour or profile by using a sanding belt or tape or grinding cloth having a substantial ability to elastically expand in a direction extending across its longitudinal direction because under these circumstances the grinding cloth or emery cloth may assume precisely the desired contours. Such elastic grinding cloth tapes are used, for example, for grinding contours by means of an endless belt, whereby these belts have the required expansion elasticity for enabling the belts to elastically adapt themselves to the surface configuration to be ground.

According to the invention the crosswise elasticity of the grinding or finishing cloth must be such that as a result of the internal pressure in the expanding and curing foam material in the mold the cloth is capable of intimately hugging the surface configuration of an insert in the mold having the shape of the counter or matching surface to be assumed by the tool being manufactured, whereby the cloth will follow the sharp edges and corners of the required surface configuration or profile. It is possible to use such highly flexible grinding or finishing cloth in the process according to the invention without any trouble because after the curing and hardening of the foam material this initially elastic cloth is intimately bonded to the foam material, thereby assuming its desired shape which it retains throughout the useful life of the tool.

According to a further advantageous embodiment of the invention the profiled surface in the mold may be a body having suction bores connected to a reduced pressure or suction conduit. In this manner it is possible to hold the grinding or finishing cloth to the contour of the profiled body in the mold prior and during the introduction of the foam material into the mold. The suction may be switched off when the expanding and curing foam material generates the necessary pressure in the closed mold for providing the intimate bonding between the cloth and the foam material. However, instead of the suction for holding the cloth to the surface configuration of the profiled body it is possible to temporarily secure the cloth to such body by means of clamps or an adhesive tape or a suitable temporarily effective adhesive.

According to another embodiment of the invention it is possible to not use the grinding or polishing cloth altogether and to initially apply the grinding or polishing material to the profiled surface of an insert in the mold, for example, by sprinkling the grinding or finishing or polishing material onto such surface, whereupon the material is intimately bonded to the surface of the foam material when the latter is curing. Thus, the counter or matching surface of the foam material tool is forming the grinding or finishing surface.

The economy of the present method is enhanced when the mold has a substantial length, for example, 1 m so that the resulting long tool can be cut into portions of suitable length. In this instance it is suitable or practical to provide the insert body with the suction bores so that these bores are located in the partition plane of the entire mold structure and of the insert body. This type of manufacturing a long molded foam material body with its subsequent cutting, substantially reduces the manufacturing costs, especially if the inner volume of the mold and thus of the resulting tool is so selected that one or several commercially available cartridges holding the foam material may be used for filling the mold, thereby avoiding any waste. Depending on the type of tool desired, for example for the purpose of rough grinding or fine finishing, different types of foam materials may be selected so that the resulting tool may have a certain pressure elasticity on the one hand, or a it may range to a rather hard foam type of tool.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
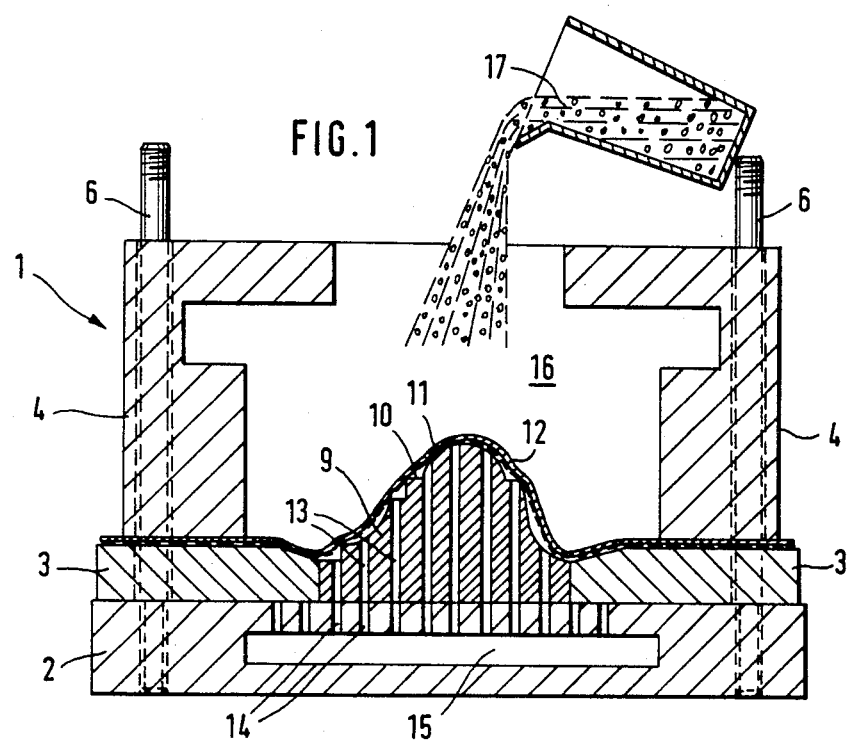
FIG. 1 is a sectional view through a foaming mold equipped with an insert profiled body.

The molding tool 1 shown in FIG. 1 for performing the present method comprises a base plate 2, an intermediate plate 3 and side wall components 4. These elements are assembled to form the mold and held together with the aid of threaded bolts 6 and nuts 7, whereby a cover member 5, shown in FIG. 2, closes the mold. The side wall components 4 and the intermediate plate 3 are divisible so that upon removal of the threaded bolts 6 the mold can be opened by removing the side wall components 4 laterally.

Figure 2:
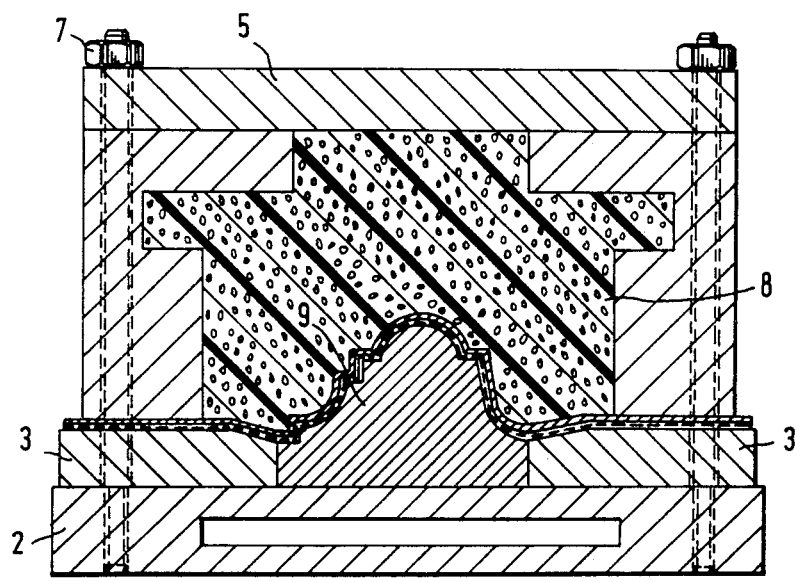
FIG. 2 shows a sectional view similar to that of FIG. 1, however, after the complete filling of the mold by a foam material.

In order to produce a grinding or sanding or finishing tool such as shown at 8 in FIG. 2, the mold is first assembled and a body 9 having a profiled surface configuration is placed into the mold in any suitable position so that the profiled surface configuration or contour faces into the mold. Preferably, the body 9 is placed onto the base plate 2 between the two intermediate plate portions 3. Thereafter, a grinding tape or belt 11 is placed onto the profiled surface 10 of the body 9 and onto the intermediate plate portions 3. The surface of the belt or tape 11 facing the body 9, or rather the profiled surface 10 of the body 9, is covered with a grinding or polishing medium 12 of conventional construction. Initially, the tape or belt 11 covered with the grinding or polishing medium 12 only conforms approximately to the surface configuration 10 of the body 9 as shown in FIG. 1. Additionally, the edges of the belt or tape 11 are held in place by the side wall components 4 also as seen in FIG. 1.

The profiled body 9 is provided with suction channels 13 preferably extending perpendicularly to the horizontal. The suction channels 13 communicate with respective channels 14 in the base plate 2 and with a suction or reduced pressure channel 15. The channel 15 extends through the base plate 2 and is operatively connected to a conventional suction generator not shown.

After the above steps have been completed, the wall portions 4 are secured to the bottom portion by means of the threaded bolts 6 to form the mold space 16 for receiving the foam material 17. However, prior to beginning the pouring of the foam material 17, suction may be applied through the channels 15, 14 and 13, whereby the tape or belt 11 is caused to conform to the surface configuration 10 of the body 9.

After completion of the filling of the foam material into the hollow mold space 16, the mold 1 is closed by the cover 5, whereby the nuts 7 tightly hold the cover 5 down so that the pressure generated by the chemical reaction of the foaming material is sufficient to keep the elastic tape or cloth 11 in a position closely or precisely hugging the profiled surface 10 of the body 9. By properly selecting the elasticity or stretchability of the tape or cloth 11 in the direction perpendicularly to or across the longitudinal axis of the profiled body 9 it is assured that the tape or cloth 11 precisely hugs even the sharp edges and corners of the profiled surface or configuration 10. Simultaneously, due to the curing of the foam material the tape or cloth 11 is intimately bonded to the foam material 17 in a nonremovable manner so that the contour assumed by the tape or cloth 11 is maintained after the tool is removed from the mold 1.

Figure 3:
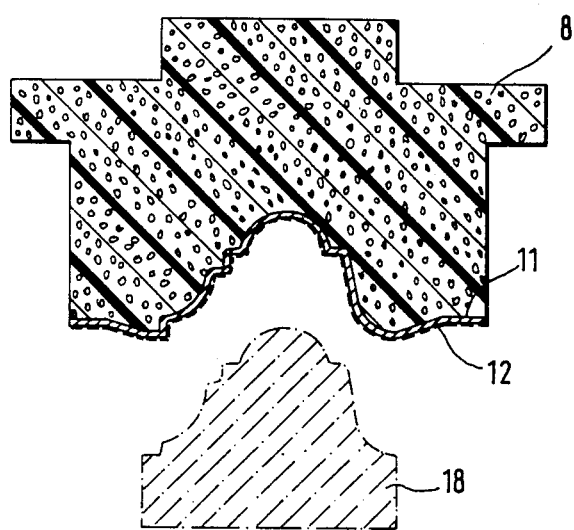
FIG. 3 illustrates a sectional view through a tool according to the invention.

After completion of the curing of the foam material 17 the finished tool 8 may be removed from the mold 1 by disassemblying the mold and all that needs to be done is to trim the lateral edges of the tape or cloth 11. As shown in FIG. 3 the tool 8 has the edges of the cloth or tape 11 already trimmed and is now directly suitable for sanding or finishing the surface configuration of a molding 18 shown in phantom lines in FIG. 3.

As mentioned above, the mold may have a substantial extension in the direction extending perpendicularly to the plane of the drawing, whereby after the completion of the curing the length of molded tool may be cut into a plurality of tools. Further, the mold may be so constructed that several bodies 9 may be placed simultaneously into a mold for separating the resulting body into several tools along predetermined planes.

Although the invention has been described with reference to specific example embodiments, it will be appreciated, that it is intended, to cover all modifications and equivalents within the scope of the appended claims.

What is claimed is:

1. A sanding or finishing tool, comprising a molded, cured foam material body having a longitudinal dimension, said body having at least one profiled surface contour for supporting abrasive or finishing material, an intermediate layer of elastic material having said abrasive or finishing material secured to one of its surfaces, said intermediate layer of elastic material having initially a substantial ability to expand in a direction across said longitudinal dimension for assuming precisely said profiled surface contour, said elastic material of said intermediate layer remaining sufficiently elastic or flexible in said direction across said longitudinal dimension even with the abrasive or finishing material secured thereto for precisely hugging said profiled surface contour, said intermediate layer being bonded with its other surface to the profiled surface contour of said foam material body as a result of the foaming and curing of the foam material.

2. A method for producing a sanding or finishing tool having a contoured surface with a longitudinal dimension, said contoured surface carrying an abrasive or finishing material, comprising the following steps:
(a) providing a foaming mold cavity and a profiled body as a separate insert in said foaming mold cavity, said insert having a profiled surface which is complementary to said contoured surface of said tool,
(b) securing said insert in said mold cavity so that said profiled surface of said insert faces into said mold cavity,
(c) covering said profiled surface of said insert with an elastic belt carrying an abrasive or finishing material on one belt surface facing said profiled surface of said insert, said elastic belt having a substantial ability to elastically expand in a cross-direction extending across said longitudinal dimension of said contoured surface, and
(d) introducing into said mold cavity a foamable and curable foam material, closing said mold cavity, foaming and curing said foam material thereby filling said mold cavity so that the pressure resulting from the foaming of the foam material causes said elastic belt to precisely hug said profiled surface of said insert as a result of said elastic belt's ability to elastically expand in said cross-direction, said curing simultaneously bonding said foam material to said elastic belt.

3. The method of claim 2, wherein said step of providing said foaming mold cavity includes assembling separate base means, side wall means, and cover means to form said foaming mold cavity, and wherein said covering step includes clamping edges of said elastic belt between said base means and said side wall means when the side wall means are assembled to form said foaming mold cavity.

4. The method of claim 2, wherein said separate insert is provided with suction holes for applying a reduced pressure between said profiled surface of said insert and said elastic belt.

* * * * *